July 19, 1927.

R. FISCHBACH  
STOP VALVE  
Filed Sept. 3, 1921

1,636,297

Inventor:
R. Fischbach
by Marks & Clerk
Attys.

Patented July 19, 1927.

1,636,297

UNITED STATES PATENT OFFICE.

RICHARD FISCHBACH, OF BERLIN, GERMANY.

STOP VALVE.

Application filed September 3, 1921, Serial No. 498,516, and in Germany August 13, 1920.

This invention relates to stop-valves of the sliding gate type wherein the jointing plates or discs composing the gate or shutter are moved between parallel jointing surfaces or seatings by means of the valve spindle without touching the seatings.

Stop valves of the type referred to are known in which the means for moving the discs towards and away from their seatings comprises a single screw bolt having two oppositehanded threads and arranged co-axially with the pipe line, said bolt being screwed into threaded holes provided in the discs by means of a lever actuated by the valve spindle. This construction precludes the accurate control and positive actuation of the discs in all positions and the discs are pressed against their seatings with a helical movement which rapidly wears and damages the jointing faces. Moreover, screws with opposite-handed threads are very expensive as compared with single threaded screws.

The present invention has for its object to avoid these drawbacks and with this object in view, the invention consists in providing a shutter comprising two non-circular discs which are adapted to co-operate with the valve body, so as to be prevented by the valve body from rotating, and a screw gear comprising two threaded spindles, the threads of which have the same hand and means for turning said spindles in opposite directions for moving the said discs into and out of close contact with the valve seatings.

Figure 1:
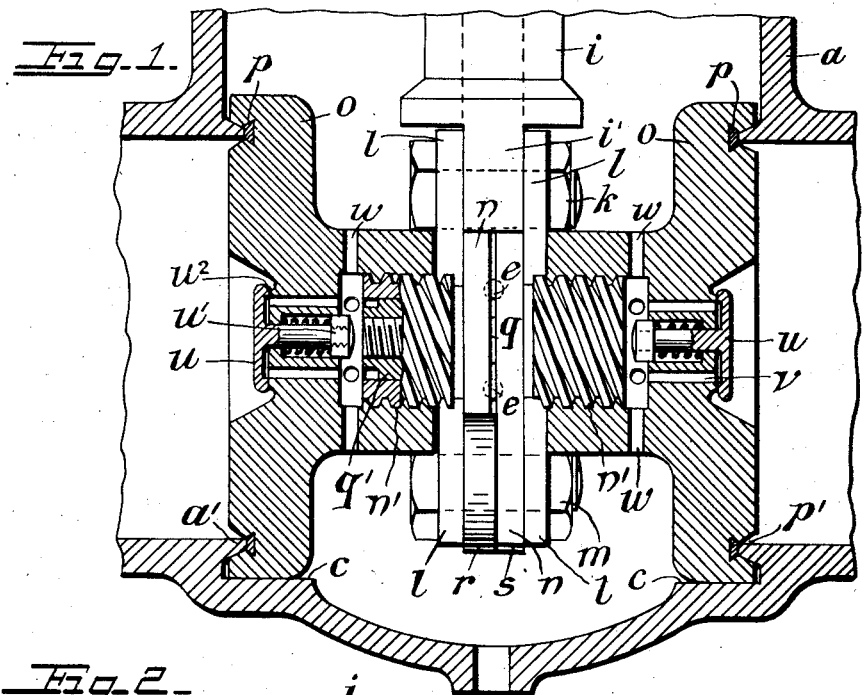
Figure 2:
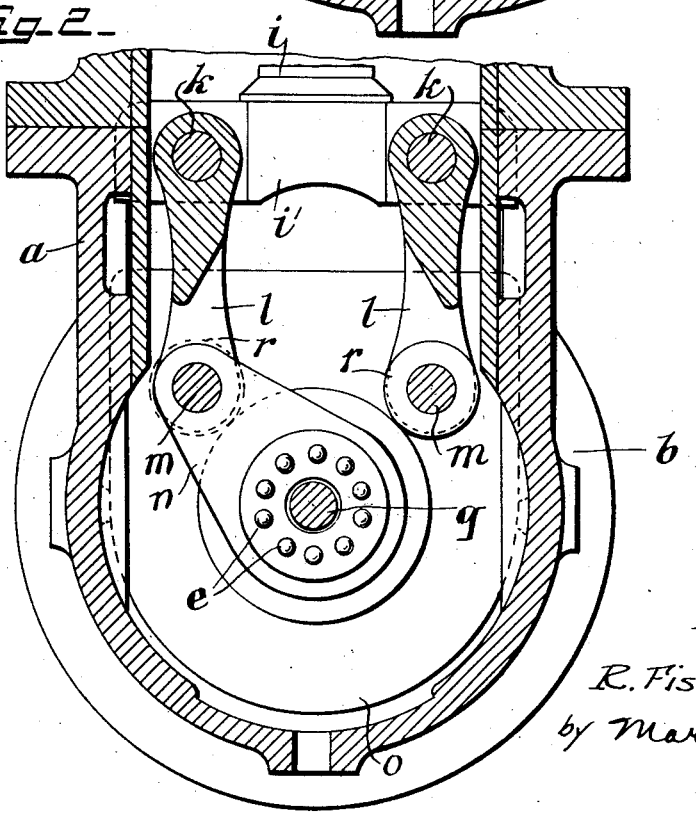

This and other features of the invention will be described with reference to the accompanying drawings in which Figure 1 is a part vertical section and Figure 2 is a cross-sectional view of the improved valve.

The valve casing $a$ is provided at each end with a flange $b$, only one of which is shown in Figure 2. Within the interior of the valve casing are the usual jointing faces or seatings $a'$. The valve spindle (not shown) is screw-threaded and is enclosed by an internally threaded sleeve $i$, only the lower end of which is shown, the said sleeve being raised or lowered by the rotation of the valve spindle. The lower end of the sleeve $i$ merges into a cross beam $i'$ provided with two bolts $k$. Pivoted on the bolts $k$ are the upper ends of the two links $l$ the lower ends of which are pivoted on the bolts $m$ provided on two crank arms $n$. A loose collar or roller $r$ is arranged on each of the bolts $m$ in order to keep the two links at the required distance apart from each other, and to provide suitable guiding means. The cranks $n$, are rigidly connected to two threaded spindles $n'$ the threads on which have the same hand. The two spindles $n'$ are connected together by means of a screw bolt $q$ and a nut $q'$, a plurality of bearing balls $e$ being interposed between the opposing ends of the spindles $n'$. The screw threads of the two spindles engage internal screw threads formed in axial bores provided in the non-circular valve discs $o$. Packing rings $p$ are fitted into the valve discs near the edges thereof, the said packing rings being adapted to bear against the seatings $a'$ when the valve is closed. The walls of the recesses $p'$ overlap the valve seatings $a'$ when the valve discs are in close contact with the seatings.

Each valve disc $o$ is provided with a small relief valve $u$ which is adapted to close or open apertures $v$ formed in the valve disc. The apertures $v$ communicate with the axial bores formed in the valve discs for the reception of the spindles of the screw gear, the said axial bores in turn communicating with the space inside of the valve by means of apertures $w$ formed in the reduced parts of the valve discs $o$. A round nut $u'$ is provided at the end of the stem of each of the valves $u$, said nut $u'$ serving as a guide and also as an abutment for a spring for closing the valve.

The valve operates in the following manner: Assuming that the valve discs have been lowered into the position shown in Figure 1, until they rest on the stops $c$, the seatings $p$ will be co-axial with the seatings $a'$ and in close contact herewith, the relief valves $u$ closing the apertures $v$. If the valve is to be opened, that is if the no-pressure side is to be put under pressure the spindles $n'$ are screwed into the threaded bores in the valve discs by rotating the cranks $n$ and the two valve discs $o$ will be free to approach to one another. The fluid on the pressure side of the valve will thereupon force the respective valve disc $o$ off its seating $a'$ and flow into the valve chamber, pressing against the inside of the valve disc on the no-pressure side, thus preventing a gap forming on the no-pressure side, and keeping the valve disc in contact with its seating. The pressure fluid will, however, flow through the apertures w of the valve disc o on the no-pressure side into the apertures v and will lift the valve u of this valve disc as soon as the pressure is sufficient to overcome the force of the valve spring of the valve u. In this manner the pressure on the two valve discs o is equalized. If for any reason the valve disc u on the no-pressure side is not lifted by the pressure of the inflowing fluid, on the screw spindles n' being screwed further into the threaded bores on the valve discs o the said spindles will bear against the round nuts u' and thereby force the valves u off their seatings. On the spindles n' being rotated further, the valve discs o will be approached to one another until the links l become vertical after which the valve discs will be raised while being held clear of their seatings as the valve spindle is screwed into the sleeve i. By this means it is possible to lift the two valve discs into the upper portion of the valve chamber without requiring any particular exertion.

In order to close the valve the valve spindle is screwed out of the sleeve i whereby the discs o are lowered until they rest upon the stops c. Upon the sleeve being lowered still further, the cranks n are rotated in the opposite direction to that in which they are rotated during the opening of the valve. As the valvs discs o are shield-shaped and are prevented by the valve body from rotating, this rotation of the cranks n causes the spindles n' to screw out of the threaded bores in the discs o and moves the said discs into close contact with the seatings a', thereby closing the valve.

What I claim is:—

1. A stop valve of the sliding gate or shutter type, comprising in combination a valve body having inlet and outlet ports, a valve seating at each of said ports inside the valve body, a shutter comprising two non-circular discs for closing said ports, said discs being adapted to co-operate with the valve body for preventing rotation of the discs, and screw gearing for moving said discs into and out of close contact with the said valve seatings, said screw gearing comprising two threaded spindles, the threads of which have the same hand and means for turning said spindles in opposite directions as set forth.

2. A stop valve of the sliding gate or shutter type comprising in combination a valve body, having inlet and outlet ports, a valve seating at each of said ports inside the valve body, a shutter comprising two shield-shaped discs for closing said ports, said discs being adapted to co-operate with the valve body for preventing rotation of the discs, screw gearing comprising two spindles for moving said discs into and out of close contact with the said valve seatings, crank arms provided on said spindles, means comprising a cross beam for raising and lowering said discs and links for connecting said crank arms to said cross beam for turning said spindles in opposite directions as set forth.

3. A stop valve of the sliding gate or shutter type, comprising in combination a valve body having inlet and outlet ports, a valve seating at each of said ports inside the valve body, a shutter comprising two non-circular discs for closing said ports, said discs being adapted to co-operate with the valve body for preventing rotation of the discs, and screw gearing comprising two spindles for moving said discs into and out of close contact with the said valve seatings, and a thrust bearing comprising a plurality of bearing balls interposed between opposing ends of said spindles, as set forth.

4. A stop valve as set forth in claim 1, having the non-circular discs provided with annular recesses capable of overlapping the seatings in the valve body and packing rings provided in the bottoms of said recesses, said packing rings being capable of co-operating with the seatings inside the valve body to form a pressure tight joint, as set forth.

5. A stop valve as set forth in claim 1, having axial screw-threaded holes provided in the non-circular discs, the screw threads of said axial holes being adapted to receive and co-operate with the spindles of the screw gearing, as set forth.

6. A stop valve of the sliding gate or shutter type, comprising in combination a valve body having inlet and outlet ports, a main valve seating at each of said ports inside the valve body, a shutter comprising two non-circular valve discs for closing said ports, said discs being adapted to co-operate with the valve body for preventing rotation of the discs, screw gearing comprising two spindles for moving said non-circular discs into and out of close contact with the said main valve seatings, screw-threaded holes provided in the non-circular discs for receiving the spindles of the screw gearing, apertures provided in the non-circular discs and parallel to the axes thereof, said apertures being in open communication with the screw threaded holes, relief valves capable of obstructing the passage of pressure fluid through said apertures, seatings for said relief valves provided on the non-circular discs and further apertures provided in the discs in open communication with the inside of the valve body and with the said screw-threaded holes, as set forth.

In testimony whereof I affix my signature.

RICHARD FISCHBACH.